US009058188B2

(12) United States Patent
Latzina et al.

(10) Patent No.: US 9,058,188 B2
(45) Date of Patent: Jun. 16, 2015

(54) TRANSFORMATIVE USER INTERFACES

(75) Inventors: Markus Latzina, Wiesenbach (DE); Joerg Beringer, Los Altos, CA (US)

(73) Assignee: SAP SE, Walldorf (DE)

( * ) Notice: Subject to any disclaimer, the term of this patent is extended or adjusted under 35 U.S.C. 154(b) by 461 days.

(21) Appl. No.: 13/267,668

(22) Filed: Oct. 6, 2011

(65) Prior Publication Data

US 2013/0091448 A1    Apr. 11, 2013

(51) Int. Cl.
*G06F 3/14* (2006.01)
*G06F 9/44* (2006.01)

(52) U.S. Cl.
CPC .................................. *G06F 9/4443* (2013.01)

(58) Field of Classification Search
CPC ..................................... G06F 3/14; G06F 3/17
USPC ............... 715/200–277; 700/701–866; 709/201–229; 705/50–79; 345/30–111
See application file for complete search history.

(56) References Cited

U.S. PATENT DOCUMENTS

| 7,047,241 | B1* | 5/2006 | Erickson | 1/1 |
| 2010/0251129 | A1* | 9/2010 | Beringer et al. | 715/738 |
| 2013/0054757 | A1* | 2/2013 | Spitz et al. | 709/219 |

OTHER PUBLICATIONS

Dubberly, Hugh, "Design in the Age of Biology: Shifting From a Mechanical-Object Ethos to an Organic-Systems Ethos", Interactions, 15(5), (2008), 35-41.

Hutchins, Edwin L, et al., "Direct Manipulation Interfaces", Human-Computer Interaction, 1(4), (1985), 311-338.
Kinsolving, Ernest, et al., "The Posture of Portals", SAP Design Guild, [Online]. Retrieved from the Internet: <URL: http://www.sapdesignguild.org/editions/edition3/print_cooper.asp>, (May 2001), 3 pgs.
Shneiderman, B,, "Direct Manipulation: A Step Beyond Programming Languages", Computer 16(8), (Aug. 1983), 57-69.
Rasmussen, Jens, et al., *Cognitive Systems Engineering*. Wiley-Interscience; 1 edition. John Wiley & Sons, Inc., (1994), 393 pgs.
"Ergonomics of human-system interaction—Part 110: Dialogue principles", ISO 9241-110:2006, International Organization for Standarization, (2006), 28 pgs.
Dix, Alan, "Designing for appropriation", vol. 2 Proceedings of the 21st BCS HCI Group Conference © Alan Dix, 2007, [Online]. Retrieved from the Internet: <URL: http://www.bcs.org/upload/pdf/ewic_hc07_sppaper7.pdf>, (Sep. 3-7, 2007), 4 pgs.

(Continued)

*Primary Examiner* — Ruay Ho
(74) *Attorney, Agent, or Firm* — Schwegman Lundberg & Woessner, P.A.

(57) ABSTRACT

Various examples include systems, methods, and software that provide transformative user interfaces. Some examples include a container renderable within a user interface of a computing application. In some such examples, code of the container may be executable to receive an object to present within the container. Further, and based on a context of the container, such examples may present a view of the object within the container based on rendering information retrieved by the container via a rendering service of the object defining how the object is to be presented within the particular context of the container amongst a plurality of possible contexts within which the object can be rendered. In some examples, a container may further override and modify object behaviors when depending upon at least the particular container or context the context thereof.

18 Claims, 7 Drawing Sheets

(56) References Cited

OTHER PUBLICATIONS

Dourish, P, "The Appropriation of Interactive Technologies: Some Lessons from Placeless Documents.", Computer Supported Cooperative Work 12, 4, [Online]. Retrieved from the Internet: <URL: http://www.dourish.com/publications/2002/jcscw-appropriation.pdf>, (2003), 465-490.

Fischer, G, "Meta-Design: A Framework for the Future of End User Development.", End User Development, H. Lieberman, F. Paternò, V. Wulf, eds. Springer, Dordrecht, [Online]. Retrieved from the Internet: <URL: http://l3d.cs.colorado.edu/~gerhard/papers/EUD-meta-design-online.pdf>, (2006), 427-457.

Melichar, C, "Content vs. Container", [Online]. Retrieved from the Internet: <URL: http://www.intermediablog.com/2006/12/content_vs_cont.html>, (Dec. 8, 2006), 2 pgs.

Salovaara, Antti, "Studying appropriation of everyday technologies: A cognitive approach", Proc. of the 27th International Conference. Extended Abstracts on Human Factors in Computing Systems. ACM, New York., (Apr. 4-9, 2009), 3141-3144.

Schneyer, Mark, "Containers and devices, and how to decouple the right way", [Online]. Retrieved from the Internet: <URL: http://markschneyer.com/2010/10/containers-and-devices-and-how-to-decouple-the-right-way/>, (2010), 2 pgs.

Sengers, Phoebe, et al., "Designing for Interpretation", Proc. of HCI International 2005, (2005), 10 pgs.

Wulf, V, et al., "Component-based tailorability: Enabling highly flexible software applications", International Journal of Human-Computer Studies 66, 1, © 2007 ElsevierLtd., (2008), 1-22.

\* cited by examiner

TRANSFORMATIVE USER INTERFACES

BACKGROUND INFORMATION

Software systems and programs have traditionally been developed based on requirements set with the goal of providing users tools to accomplish specific tasks with task-specific data. As a result, software systems and programs provide functionality silos, which require users to traverse user interfaces, applications, and datasets to accomplish tasks for which requirements have not been considered when developing the software. Further, tasks users perform generally adapt over time with respect to evolving practices and changing business conditions. Constantly adapting software and specializing design for each potential situation is overly time consuming and expensive.

DETAILED DESCRIPTION

Common approaches to user experience design have sought to provide users with design solutions deemed optimal for a given set of user tasks. As a result, very task specific applications and user interfaces have been designed and deployed which force users to switch between applications, utilities, and interfaces. Further, while such user experiences may be very well suited for the tasks envisioned during a development process, such experiences are not flexible to changing needs and user creativity. Thus, perceived optimal design often tends to be less than optimal over time.

Various embodiments illustrated and described herein include transformative user interfaces that provide dynamic user experiences by decoupling content from containers that present content and allowing users to tailor their own user experiences to a personally optimal form, or at least near personally optimal, on an evolving basis. Transformative user interfaces allow for linking and organization of data according to user needs in an essentially unbounded manner.

In some embodiments, an object provides services to allow containers in transformative user interfaces to render the object and establish links to the object itself and its related content. The transformative user interfaces generally operate according to a transformative user interface framework. The transformative user interface framework provisions objects with default contextual usage options, including representation styles, from which containers can choose. The container can query objects for available contextual usage options and choose the appropriate representation style or dissolve ambiguity via user intervention. Depending on container context, user interaction, and combinations of objects within the container, the active contextual usage option may change on the fly. Stated more simply, transformative user interfaces allow users to tailor user interfaces to their particular needs without requiring time consuming and expensive development efforts.

Contextual usage options defined within objects according to the transformative user interface framework are faceless projections on the object that model the data needed for rendering the object. In analogy to the MVC model (Model—View—Controller), the object is providing different models (Ms) for different representation styles of the contextual usage options. Based on the representation styles of the contextual usage options, containers can flexibly adjust the appearance of objects as required by the container specific context. For example, a line item in a table, a business card, or a thumbnail. The container is responsible for the final rendering (V) and dispatching events (C). Thus, the container within the transformative user interface framework includes graphical rendering options, or contexts, including graphical user interface definitions within which objects may be presented. Data the container presents when rendering an object according to a particular context is defined within the object itself by providing mappings of object elements, such as data of the object or data accessible via services of the object, to graphical user interface elements defined within the various options or contexts of the container. These mappings are accessed by the container within the object via one or more object services standardized across objects when generating an object rendering. The mappings are generally metadata that may be stored within or otherwise associated with the objects.

Besides metadata for helping containers in flexibly rendering objects, the transformative user interface framework, in some embodiments, also provides navigational and behavioral services within the objects that are accessible by the container and other objects. Navigation services allow a container to navigate, in response to user input, to the object and related objects via standardized services provided across the objects. Behavior services included in objects include services defining how the object is to generally execute (i.e., behave) and may include context specific services when a particular object is to behave in non-standard manner when rendered by a container in a particular context.

Containers can consume objects at different contract levels, or service level agreements and abstraction levels. If the container is specialized for a certain object class, it can query all domain specific behaviors and attributes and possibly has an MVC schema implemented that relies on a very specific data repository. User interfaces of applications displaying data local to an application may have such high service level agreements between a consuming container and the data model of an object. Other containers may be designed to consume any type of object. In this case, the service level agreement is reduced to a transformative user interface that enables the container to query the object about contextual usage options and common actions through introspection of the object by the container.

In some embodiments, a container may enrich objects with behaviors and data specific to a container semantic. Leveraging the transformative user interface services, a container in such embodiments can handle an embedded object as an abstract item and cast the object in a container specific manner while still maintaining the lineage to the original object. For example, a customer account object might be embedded in a sales tool-tailored container and presented as a candidate (i.e., a decision option) for a reference customer. In this context, the behaviors and attributes of being a decision option are more significant in the sales tool-tailored container than the original CRM object properties.

In this embodiment, a container may include one or more services that override object services in some or all contexts within which an object may be presented. The overriding of object services through container services may override an object service completely or in part. A container service may also augment an object service, such as providing additional processing. The augmenting of object services by a container may further include offering additional object rendering abilities that are not defined within an object. In all these cases, the container can still navigate and use the object-specific services but is also able to treat it as a context specific entity.

In another embodiment, a container itself may be context-free, except being a general-purpose container. A user may add objects to this container and the container treats the added objects as business cards, list items, or other general rendering items depending on the amount of data and input gestures received from a user and the objects. The user may then convert the generic container into a ToDo list, for example by choosing among a palette of application contexts available. The general-purpose container may also convert the container into another contextual form by inferring a context based on what objects have been added, and even where objects have been added. The inference may be based on the objects themselves, object metadata that describes how to display the objects, object metadata that describes how received objects are related, user preferences or configuration settings that instruct general purpose container on how to present objects, and other object metadata and other data depending on the particular embodiment. Context changing in such embodiments activates the newly specified or inferred context for the container, which may change the treatment of embedded objects as well with respect to presentation and behavior. In one example, an employee object may be presented in a container in a business card context. A second employee object may then be added to the same container. Rather than displaying two business cards, the container may infer that it now has a collection of objects and then change the context of the container to present the objects in a spreadsheet-type. Depending on the changed context, the container may then perform other actions with regard to object data presented therein, such as sorting, ranking, assignment of owners, setting of due date, highlighting, and other actions. Thus, containers can change context through explicit interaction with users, implicitly based on the objects added to them, or based on other data such as configuration settings, user preferences, and learned user behaviors.

In some embodiments, a container can query another container for content via the transformative user interfaces of containers and objects. For example, a hosting container may include a service accessible via a standardized interface of the hosting container that returns a list of objects presented therein including handles to standardized interfaces of the objects. This enables a requesting container to query the objects of the hosting container to obtain information about object capabilities and presentation information. Separate from the core object semantic, the hosting container may also expose a container specific object semantic to allow the requesting container to adopt aspects of the hosting container. For example, the releasing container may have a project management context and treat embedded items as ToDo items of a ToDo list. Instead of just obtaining a supplier object or an abstract item object handed over from the ToDo list context of the releasing container, the requesting container can extract the object as a ToDo item if that better matches its local semantic.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
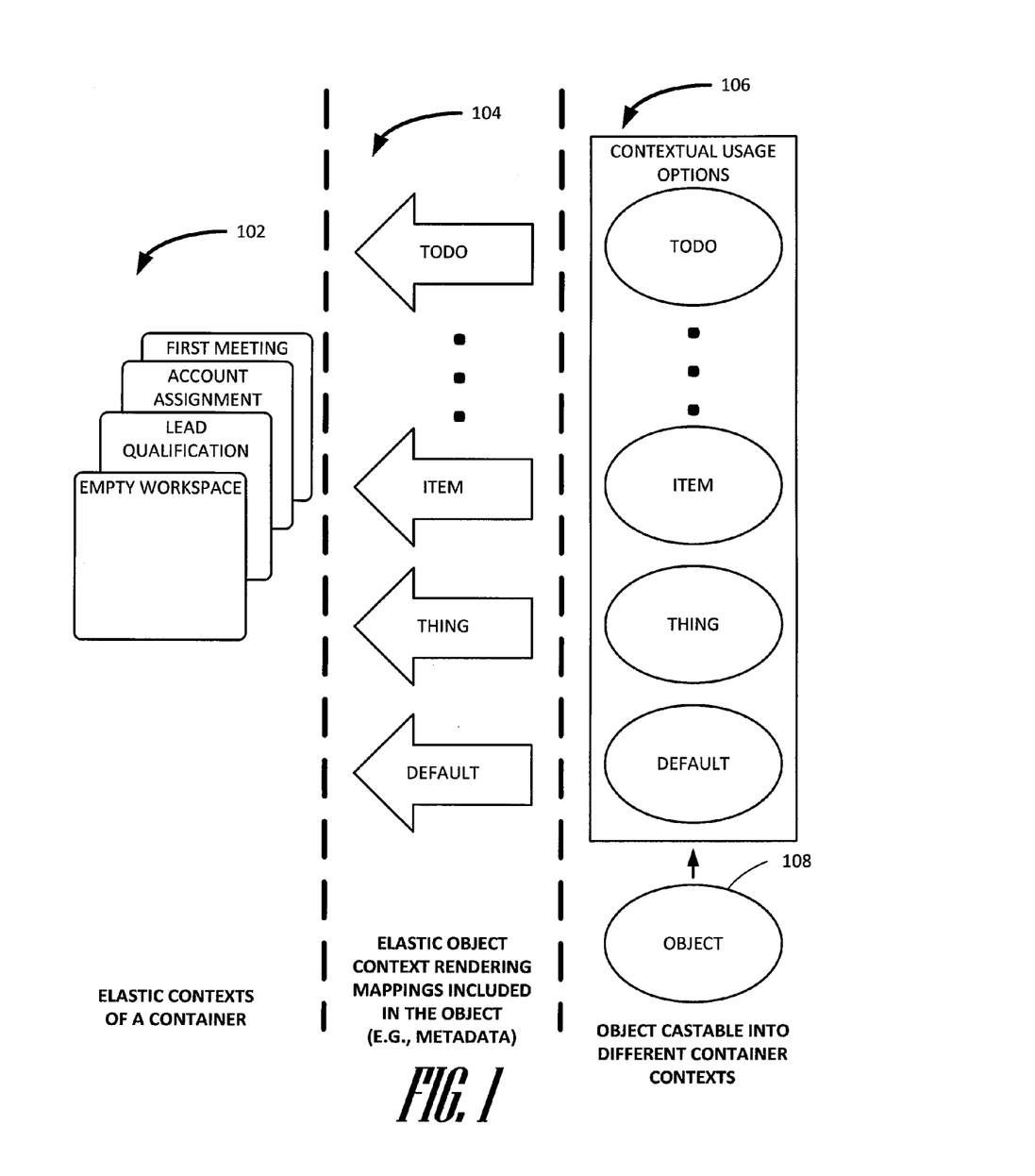
FIG. 1 illustrates an object in relation to container contexts, according to an example embodiment.

FIG. 1 illustrates an object in relation to container contexts, according to an example embodiment. The illustration of FIG. 1 includes containers each having different contexts 102 (i.e., first meeting, account assignment, lead qualification, and empty workspace contexts). Each of the different contexts 102 are presentable within a container in a user interface of a computing application that may execute on a personal computer, a smartphone, a set top box, or other computing device. Thus, the computing application may take one of several forms in various embodiments, which may be commonly referred to as applications, apps, applets, and the like.

Each of the multiple contexts 102 defines user interface layouts including various controls for presenting and manipulating data received from one or more objects which may be received therein, such as object 108. A container generally provides native graphical rendering options and contexts, including graphical user interface definitions within which objects may be presented. However, a container is typically not bound to any particular data within the container itself. Instead, a container is adapted to receive one or more objects through user interaction and provide a rendering of received objects according to a specification included in the received object. A container can adapt to multiple contexts over time, which makes its usage semantic elastic to cater to the situational needs of users while performing a task.

The container context may be task oriented, such as creating ToDo listings, evaluating candidates, account review, training development, scheduling, and other tasks. However, the container context is flexible to receive objects of different types, thereby adapting them to the task orientation of particular context. For example, in a scheduling context, employee objects may be received and placed in a schedule. However, if the scheduling task to be performed is with regard to fleet vehicles of an organization, vehicle objects may be received and placed in a schedule. Further, if a scheduling task to be performed is with regard to objects of various types, such as employee objects, vehicle objects, and account objects, each of these object types, and others, may be placed in the same schedule of the scheduling context. As these objects, or representations thereof, are actually placed into a single schedule, through use of standardized navigational services of the objects, as discussed below, a user may quickly navigate from a rendering of the respective objects presented in the schedule context to a native rendering of a selected object. Further, and as discussed below, navigational services may also be utilized to synchronize a presentation of further or related object data when a particular object placed in the schedule is selected.

An object, such as object 108, may include a plurality of contextual usage options 106. Each contextual usage option 106 of an object is essentially a mapping 104 of the object to a particular context of the multiple contexts 102 that might be active within a particular container. The individual mappings 104 may be to a specific context of the multiple contexts 102 or to a particular user interface primitive type, such as a business card-type layout, an appointment-type layout, a two-dimensional table layout where each data record of an object is presented as a row of data, and other user interface primitives. The mappings 104 of an object, in some embodiments, are defined in object metadata.

To make objects consumable by containers the transformative user interface framework includes a set of standardized interfaces, such as standardized services, callable by containers for various purposes. For example, the mappings 104 are accessed by the container within the objects via one or more object services standardized across objects when generating an object rendering. Calling an object service to obtain the mappings, may return metadata usable by the container or other data consumable by a rendering service of the calling container. The standardized services of objects may also include behavior services accessible by containers when performing data processing activities with regard to the object, the object data, or objects related thereto. For example, objects may include standardized services for data processing activities such as creating, reading, updating, and deleting object data. The standardized object services, in some embodiments, further include navigation services. Navigation services may provide a variety of functionality. For example, one navigation service of an object may allow a container to navigate, in response to user input, to a native view of an object presented in the container and related objects. One or more other navigation services provide linking functionality between two or more objects that may be simultaneously present in a single container or even in multiple containers presented in a single user interface view. Through the standardized object interfaces and object metadata providing rendering mappings 104 for contextual usage options 106, containers are able to implement multiple usage contexts that are elastic to the needs and purposes of users.

Figure 2:
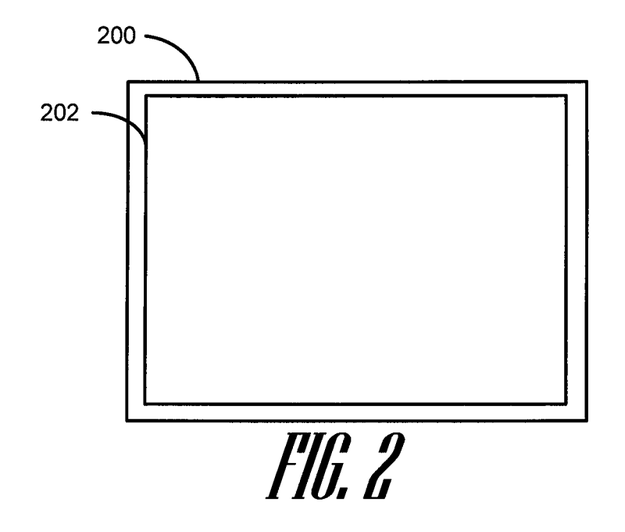
FIG. 2 is a user interface illustration, according to an example embodiment.

FIG. 2 is a user interface 200 illustration, according to an example embodiment. The user interface 200 includes a container 202 having multiple contexts for rendering objects received therein. An object may be received into the container 202 in a number of different ways. For example, an object may be selected within a data searching tool, other object, other application, data list, or other data presentation and moved to the container 202 via one or more of a drag-and-drop, cut-and-paste, or other action. In some embodiments, a user interface displaying an object, or data thereof, may include a pop-up menu item, other menu item, action button, or other control to cause the user interface 200 to be presented with the selected item placed in the container. Objects may be placed in the container 202 in further ways, depending on the particular embodiment, such as through utilization of an object navigation service as discussed above.

In some embodiments, when data is added to the container 202, an object associated with the selected data or an object through which the data was accessed may be instantiated within the container according to services of the particular object. The object, and services thereof, may be accessible locally on a computing device that executes to present the user interface 200 or accessible remotely via a network on another computing device, depending on the particular embodiment and how objects are implemented therein.

With regard to objects, an object is generally an entity, which is a common construct in software engineering and system design methodology, typically consisting of attributes specifying applicable functions or services. However, objects in many embodiments herein also include sets of standardized services of the transformative user interface framework. These sets of standardized services are known to containers and expose object information, data, and further object services to containers. The standardized services include one or more rendering services through which containers, such as container 202, accesses information for presentation of the objects. In some embodiments, such as disused above with regard to FIG. 1 and mappings 104, the one or more rendering services provide access to metadata mappings of objects to obtain the rendering information. The standardized services may also include navigation services and behavior services of the objects. Navigation services allow a container to navigate, in response to user input, to the object and related objects via standardized services provided across the objects. Behavior services included in objects include services defining how the object is to generally execute (i.e., behave) and may include context specific services when a particular object is to behave in non-standard manner when rendered by a container in a particular context.

A container, such as container 202, consumes objects, presents renderings of objects in various contexts through interaction with the one or more standardized object rendering services, and interacts with data presented in renderings of the objects based on received user input and object behavior services. Containers typically include a service that provides a mechanism for users to designate a context for the container in rendering objects. For example, when the object is added to the container and at other times to change the context, a container, such as container 202 may provide a palette of context options for presenting object therein. That context is then utilized by the container to impose contextual behaviors on embedded objects and adjust their presentation style if necessary. In some embodiments, a container may also leverage the navigational services provided by the object to use an object as an anchor for exploration or for linking data between two or more objects presented within the same container. For example, the first object may display data representative of entities. When a particular one of the entities is selected in the first object, the second object may be linked to display detail data with regard to the particular entity.

Figure 3:
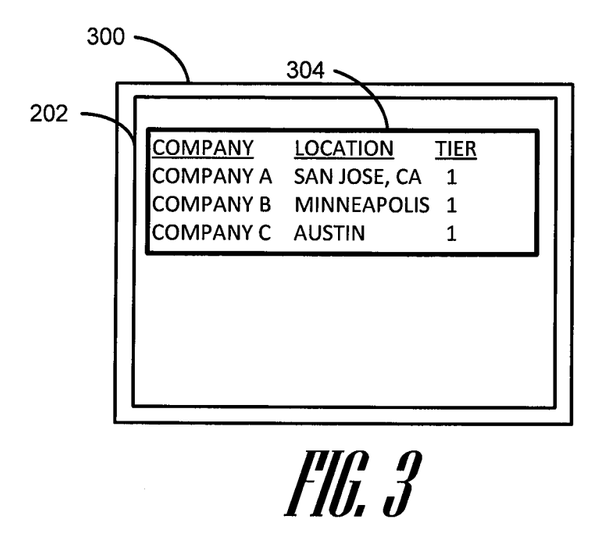
FIG. 3 is a user interface illustration, according to an example embodiment.

FIG. 3 is a user interface 300 illustration, according to an example embodiment. The user interface 300 builds on the user interface 200 of FIG. 2. The user interface 300 includes the container 202 as illustrated in FIG. 2. However, the user has placed a set of suppliers including COMPANY A, COMPANY B, and COMPANY C within the container 202, such as through a drag-and-drop action from a selected set of suppliers identified in a data-searching tool. The container 202 has thus generated an object rendering 304 by obtaining rendering information and data from an object associated with the set of suppliers placed in the container, such as a supplier or entity object of the application of the user interface 300. For example, to generate the object rendering 304, the container 202 accesses one or more rendering services of the object associated with the data of the selected suppliers according to a context. The context accessed is a context of the object, a context as specified by the user either explicitly or through a configuration settings, or based on inference made by the container in view of metadata obtained via the one or more rendering services of the object associated with the data of the selected suppliers. The object rendering 304, when manipulated by the user, will then behave within the container 202 based on behavior services of the object associated with the rendered context. For example, if a user modifies the data within the object rendering 304, a data modification service of the object behavior services will be called by a process of the container 202.

After a context has been set or otherwise determined for the object rendering 304, some embodiments may allow the context to be changed and thereby cause the object rendering 304 to be modified based on the new context in view object mappings accessible to the container 202 via one or more rendering services of the object. The context may be changed through a user interface action such as a right mouse click to view a popup menu or manipulation of another user interface 300 control or menu, depending on the particular embodiment. An example of how the context of the object rendering 304 may be modified is illustrated in FIG. 4.

In some embodiments, a container or a container context may limit the types of objects that may be received and renderings generated therefrom. For example, the context of the object rendering 304 is specific to companies. One or both of the container 202 and the object rendering 304 may include a tight binding to company-type or entity-type objects that are not relevant to other object types, such as employee objects or product objects. Thus, in such embodiments, the container 202 may limit objects that may be received and presented therein.

Figure 4:
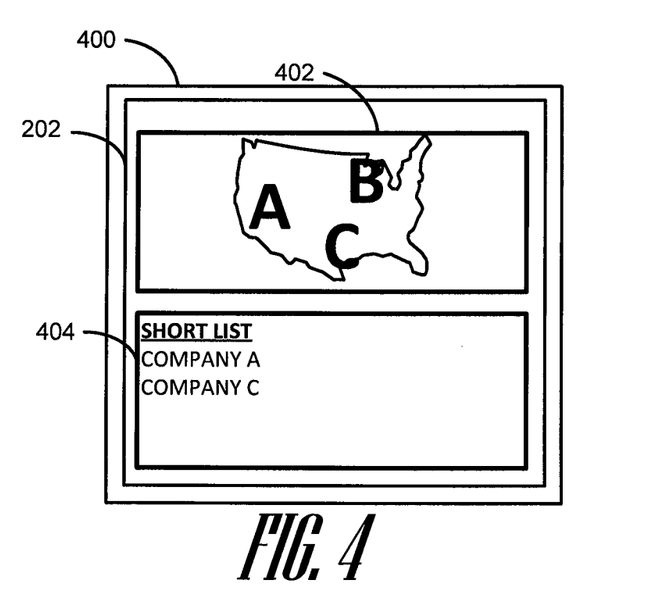
FIG. 4 is a user interface illustration, according to an example embodiment.

FIG. 4 is a user interface illustration, according to an example embodiment. The user interface 400 builds on the user interface 300 of FIG. 3. The user interface 400 includes the container 202 as illustrated in FIG. 3. The container 202 includes object rendering 402 and object rendering 404. Object rendering 402 is a rendering of the same object as object rendering 304 of FIG. 3, but with a changed context as discussed in the immediately preceding paragraph. The object rendering 402 is a rendering of the same listing of suppliers 302 data as the object rendering 304. However, the object rendering 402 is a map-based context that provides a rendering of data based on geo-spatial-type data, such as addresses. In such embodiments, the object of the supplier data may include a mapping of address data of suppliers to a map context of a container. However, the mapping may be more generic as a simple address that may be understandable by container context rendering services, such as a container service that generates the object rendering 402.

The object rendering 404 in the user interface 400 is a short listing context rendering of suppliers a user may select for further consideration in performance of a task, such as selecting a supplier to provide a particular product or service. The object rendering 404 may be added through selection of suppliers from the object rendering 402 and placed in the container 202. In such an embodiment, the context for the object rendering 404 may then be provided as user input, or determined by an inference made by the container based on the user action, and the object rendering 404 generated through interaction by the container with the one or more rendering services of the object from which the data is obtained. Note however that the object underlying the object rendering 404 is the same object underlying the object rendering 402 and the object rendering 304 of FIG. 3. The difference is with the context in which the object is presented. The object rendering 402 and object rendering 404 are examples of how a single object may be placed in the container 202 in multiple instances in different contexts, but each instance of the object conveys different contextual meaning despite being the same object with essentially the same data.

Figure 5:
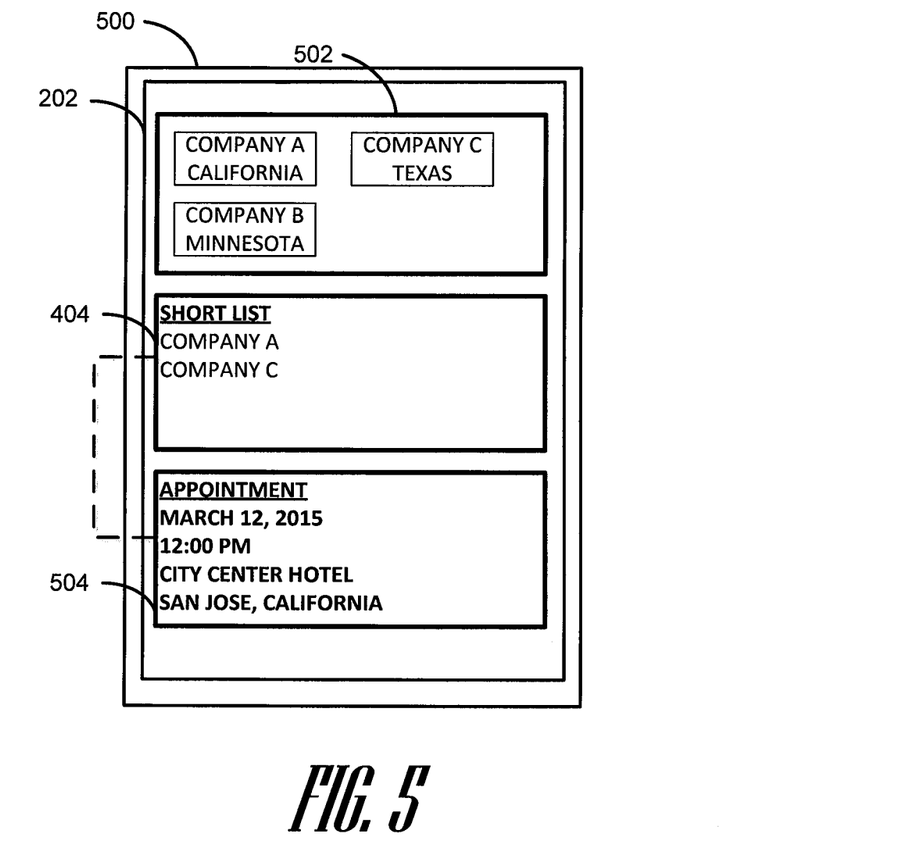
FIG. 5 is a user interface illustration, according to an example embodiment.

FIG. 5 is a user interface 500 illustration, according to an example embodiment. The user interface 500 builds on the user interface 400 of FIG. 4. The user interface 500 includes the container 202 as illustrated in FIG. 4. The container includes object rendering 502. Object rendering 502 is a rendering of the same object as object rendering 304 of FIG. 3 and object rendering 402 of FIG. 4, but again with a changed context as discussed previously. The context of the object rendering 502 is a business card context of the suppliers.

The user interface 500 further includes an object rendering 504 with appointment data that may have been selected placed in the container 202. The context of the object rendering 402 has been specified by the user to be an appointment context that displays the appointment data. The appointment data, in some embodiments, may also be presented in other contexts, such as a calendar context that renders the appointment data on a graphical view of a calendar.

In the illustrated embodiment, the object rendering 504 is linked to the object rendering 404 such that when a supplier in the rendered shortlist is selected, appointment data presented in the object rendering 504 is updated to reflect appointment data for the selected supplier. The synchronizing of data presented within the object rendering 504 with a selected data item, such as Company A, in the object rendering 404 may be performed through navigation services of the container 202 that interact at least in part with behavior services of the objects from which the object renderings 404, 504 were generated.

Figure 6:
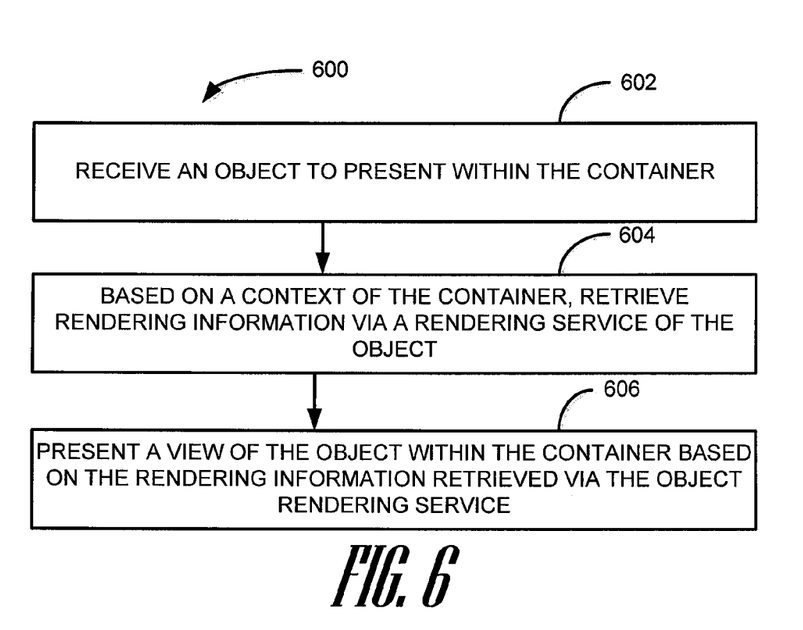
FIG. 6 is a block flow diagram of a method, according to an example embodiment.

FIG. 6 is a block flow diagram of a method 600, according to an example embodiment. The method 600 is an example of a method that may be performed by a container in presenting a view of an object. The method 600 includes receiving 602 a first object to present within a container and, based on a context of the container, retrieve 604 rendering information via a rendering service of the object. The retrieved 604 rendering information defines how the object is to be presented within the particular context of the container amongst a plurality of possible contexts within which the first object can be rendered. The method 600 further includes presenting 606 a view of the first object within the container based on the rendering information retrieved via the object rendering service.

In some embodiments of the method 600, the container, upon receipt 602 of the object, retrieves, via a service of the first object, metadata descriptive of at least one of the object and data of the object. The container may then determine a context from a plurality of possible contexts of the container in which to render the object based on the retrieved metadata. The container may then set its context based on the determined context.

Figure 7:
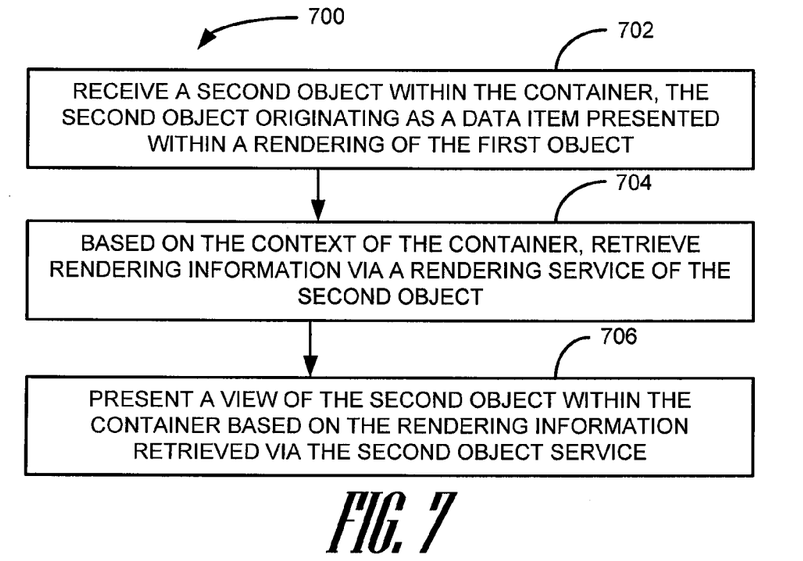
FIG. 7 is a block flow diagram of a method, according to an example embodiment.

FIG. 7 is a block flow diagram of a method 700, according to an example embodiment. The method 700 is an example of a method performed in presenting a view of a second container or second object within a container. The method 700 is illustrated and described as a continuation of the method 600 of FIG. 6. Thus, the references to the second object assume the object of the method 600 as the first object.

In some embodiments, the method 700 includes receiving 702 a second object within the container. The second object may originate as a data item presented within a rendering of the first object. Based on the context of the container, the method 700 retrieves 704 rendering information via a rendering service of the second object. The retrieved 704 rendering information may define how the second object is to be presented within the particular context of the container amongst a plurality of possible contexts within which the second object can be rendered. In other embodiments, the retrieved 704 rendering information is rendering information that is relevant to the context of the container, although the object may not include rendering information specifically referencing the particular context of the container. The method 700 further includes presenting 706 a view of the second object within the container based on the rendering information retrieved via the second object service.

Figure 8:
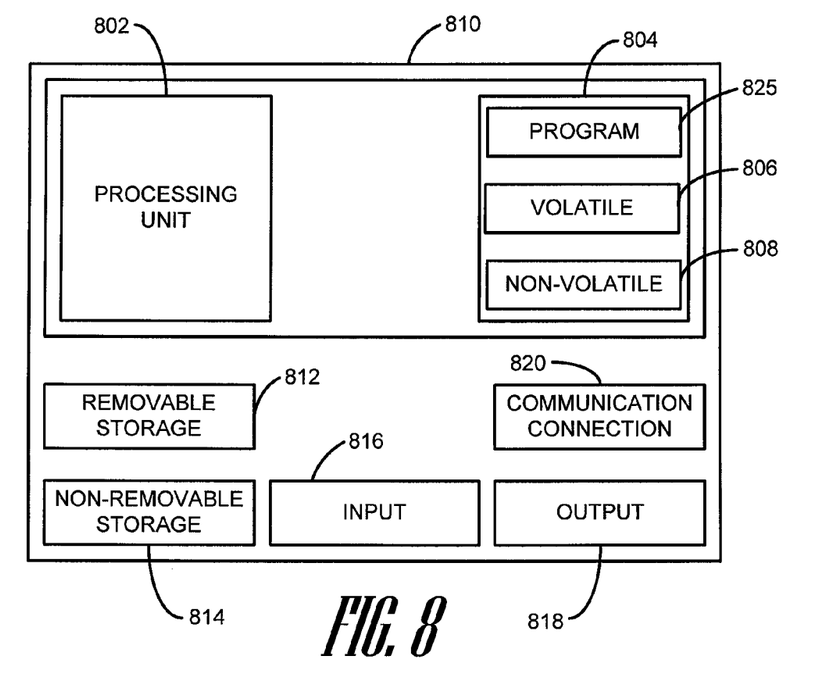
FIG. 8 is a block diagram of a computing device, according to an example embodiment.

FIG. 8 is a block diagram of a computing device, according to an example embodiment. In one embodiment, multiple such computing devices are utilized in a distributed network to implement multiple components in a transaction-based environment. An object-oriented, service-oriented, or other architecture may be used to implement such functions and communicate between the multiple systems and components. One example computing device in the form of a computer 810, may include at least one processing unit 802, memory 804, removable storage 812, and non-removable storage 814. Memory 804 may include volatile memory 806 and non-volatile memory 808. Computer 810 may include—or have access to a computing environment that includes—a variety of computer-readable mediums, such as volatile memory 806 and non-volatile memory 808, removable storage 812 and non-removable storage 814. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions and data. Computer 810 may include or have access to a computing environment that includes input 816, output 818, and a communication connection 820, such as a network interface device. The computer 810 may operate in a networked environment using a communication connection to connect to one or more remote computers, such as database servers, application servers, enterprise servers, mainframe computers, and other computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the at least one processing unit 802 of the computer 810. A hard drive, CD-ROM, and RAM are some examples of articles including a computer-readable medium. For example, a computer program 825 including instructions, executable by the at least one processing unit 802 to cause the computer to perform one or more of the methods illustrated and described herein may be stored on one or more computer-readable mediums, in whole or in part.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A container renderable within a user interface of a computing application that executes on a computing device, the container executable to:

receive a first object to present within the container;

present a view of the first object within the container based on a context of the container and rendering information retrieved by the container via a rendering service of the first object, the rendering information defining at least in part how the first object is to be presented within a particular context of the container amongst a plurality of possible contexts within whic the first object can be rendered; and completely override a behavior service of the first object with a service of the container to change at least one behavior of the first object when presented in the context of the container, wherein the service of the container does not completely override the behavior service of the first object when the container is presented in other contexts.

2. The container of claim 1, wherein the rendering service is a service standardized across objects consumable by the container.

3. The container of claim 1, wherein the container, response to input received with regard to the presented object view, calls behavior services of the first object standardized across objects consumable by the container.

4. The container of claim 1, wherein the container includes a plurality of selectable contexts.

5. The container of claim 4, wherein the context of the container is selected based on at least one of user input and at least one inference made by the container in view of an object added thereto and metadata of the object.

6. The container of claim 1, wherein the container, upon receipt of the first object:

retrieves, via a service of the first object, metadata descriptive of at least one of the first object and, data of the first object;

determines a context from a plurality of possible contexts of the container n which to render the object based on the retrieved metadata; and sets the determined context within the container.

7. The container of claim 1, the container further executable to:

receive a second object within the container, the second object originating as a data item presented within a rendering of the first object;

based on the context of the container, retrieve rendering information relevant to the context of the container via a rendering service of the second object; and present a view of the second object within the container based on the rendering information retrieved via the second object service.

8. The container of claim 7, wherein the second object is the same object as the first object and the presentation of the view of the second object is a presentation of the second object in a different context than the context of first object presentation.

9. A method comprising:
setting a context, amongst a plurality of possible contexts, of a first container within which to present a received object based on metadata associated with the received object, the metadata instructing the container of the context in which to present the received object, the received object being one of a plurality of objects consumable by containers including the first container, each of the plurality of objects including:
  a standardized rendering service standardized across the plurality of objects renderable within a user interface of a computing application; and
  standardized behavior services callable by other objects and containers and defining how the respective object executes on a computer on which the computing application executes; and
in the set context of the first container, presenting a first view of the object based on rendering information retrieved by the first container from the object via a rendering service of the object, the rendering information retrieved based on the set context, the object including a plurality of sets of rendering information for a plurality of contexts within which the object can be rendered; and
completely overriding a behavior service of the received object with a service of the first container to change behavior of the received object when presented in the set context of the first container, wherein the service of the first container does not completely override the behavior service of the first object when the first container is presented in other contexts.

10. The method of claim 9, further comprising:
receiving a selection of at least one data item within the first view of the object for presentation in a second container, each of the at least one data item associated with the object;
while maintaining the first view of the object in the first container, adding the object to the second container;
based on a context of the second container, retrieving, via the object rendering service, rendering information defining how the object is to be presented within the context of the second container;
presenting a view of the object within the second container based on the rendering information retrieved based on the context of the second container; and
linking, via a navigation service of the object, the view of the object within the first container to the view of the object in the second container.

11. The method of claim 10, wherein the navigation service of the object is one of a plurality of navigation services, the plurality of navigation services including navigation services providing access to a native view of the object and related objects within a software application performing the method.

12. The method of claim 9, further comprising:
receiving input to modify the context of the first container;
based on the modified context of the first container, retrieving rendering information via the rendering service of the object based on the modified context, the rendering information defining how the object is to be presented within the modified context of the first container; and
updating the presented view of the object within the first container based on rendering information retrieved based on the modified context.

13. The method of claim 9, further comprising;
receiving a second object to present within a second container;
based on a context of the second container, retrieving rendering information via a rendering service of the second object, the rendering information defining how the second object is to be presented within the context of the second container amongst a plurality of possible contexts within which the second object can be rendered; and
presenting a view of the second object within the container based on the rendering information retrieved via the second object rendering service.

14. The method of claim 13, wherein the second container upon receipt of the second object:
calls a navigation service of at least one of the first and second containers to discover a relationship between the object presented in the first container and the second object; and
calls a navigation service of at least one of the first and second containers to link the view of the object within the first container to the view of the second object in the second container.

15. A computer-readable medium, with instructions stored thereon, which when executed by at least one processor of a computing device, cause the computing device to:
receive an object to present within a container, the container renderable within a user interface of a computing application;
setting a context, amongst a plurality of possible contexts, of the container within which to present the received object based on metadata associated with the received object, the metadata instructing the container of the context in which to present the object;
based on the set container context, retrieve rendering information via a rendering service of the object, the rendering information defining how the object is to be presented within the set container context amongst a plurality of possible contexts within which the object can be rendered; and
present a view of the object within the container based on the rendering information retrieved via the object rendering service;
wherein the container includes at least one service that completely overrides a behavior of the object when presented in the set context of the container, wherein the at least one service of the container does not completely override the behavior of the object when the context of the container is set to other contexts.

16. The computer-readable medium of claim 15, wherein identifying the context of the container includes identifying one of a plurality of rendering options for objects within container contexts, the rendering options standardized across a set of objects consumable by the container.

17. The computer-readable medium of claim 16, wherein the object is one of a plurality of objects consumable by containers, each of the plurality of objects including standardized behavior services callable by other objects and containers and defining how respective object executes.

18. The computer-readable medium of claim 15, wherein the container includes at least one service that augments a behavior of the object when presented in at least the set context of the container.

\* \* \* \* \*